(12) United States Patent
Zhang

(10) Patent No.: US 11,180,395 B2
(45) Date of Patent: Nov. 23, 2021

(54) HORIZONTAL-FLOW SAND FILTRATION POOL AND WATER TREATMENT PROCESS THEREOF

(71) Applicant: AQSEPTENCE GROUP (HANGZHOU) CO., LTD., Zhejiang (CN)

(72) Inventor: Jiansan Zhang, Zhejiang (CN)

(73) Assignee: AQSEPTENCE GROUP (HANGZHOU) CO., LTD., Zhejiang (CN)

( * ) Notice: Subject to any disclaimer, the term of this patent is extended or adjusted under 35 U.S.C. 154(b) by 264 days.

(21) Appl. No.: 16/467,488

(22) PCT Filed: Nov. 23, 2017

(86) PCT No.: PCT/CN2017/112605
§ 371 (c)(1),
(2) Date: Jun. 6, 2019

(87) PCT Pub. No.: WO2018/103537
PCT Pub. Date: Jun. 14, 2018

(65) Prior Publication Data
US 2019/0330090 A1    Oct. 31, 2019

(30) Foreign Application Priority Data

Dec. 6, 2016  (CN) .......................... 201611109076.3
Dec. 6, 2016  (CN) .......................... 201621328393.X

(51) Int. Cl.
*C02F 3/34* (2006.01)
*B01D 24/10* (2006.01)
(Continued)

(52) U.S. Cl.
CPC .............. *C02F 3/34* (2013.01); *B01D 24/10* (2013.01); *B01D 24/46* (2013.01); *C02F 3/02* (2013.01); *Y02W 10/10* (2015.05)

(58) Field of Classification Search
CPC ... C02F 3/34; C02F 3/02; B01D 24/10; B01D 24/46; Y02W 10/10
(Continued)

(56) References Cited

U.S. PATENT DOCUMENTS 4,113,613 A * 9/1978 Sekoulov ................ C02F 1/725
                                                          210/606
4,894,149 A    1/1990 Block
(Continued)

FOREIGN PATENT DOCUMENTS

CN    101450268 A    6/2009
CN    201692706 U    1/2011
(Continued)

OTHER PUBLICATIONS

Machine-generated English translation of CN105727603, dated Apr. 17, 2021.*
(Continued)

*Primary Examiner* — Fred Prince
(74) *Attorney, Agent, or Firm* — Yue (Robert) Xu; Apex Attorneys at Law, LLP

(57) ABSTRACT

A horizontal-flow sand filtration pool and a water treatment process thereof. The horizontal-flow sand filtration pool includes a pool body, a raw water inlet assembly, a sand filtration bed, a filtered water outlet assembly, an aeration assembly, and a back washing assembly; the raw water inlet assembly includes a water inlet pipe and a water distribution device that supplies raw water to the sand filtration bed; the water inlet pipe is connected with the water distribution device, the water distribution device is provided in the sand filtration bed, and a plurality of water outlet channels are uniformly distributed on the vertical surface of the water distribution device; the filtered water outlet assembly includes a water collector and a water outlet pipe; the water outlet pipe is communicated with the water collector; the back washing assembly includes a back washing pipe and a drainage pipe.

9 Claims, 3 Drawing Sheets

(51) Int. Cl.
 *B01D 24/46* (2006.01)
 *C02F 3/02* (2006.01)
(58) Field of Classification Search
 USPC ....... 210/615, 616, 617, 793, 150, 151, 275, 210/279, 618
 See application file for complete search history.

(56) References Cited

U.S. PATENT DOCUMENTS

| | | | |
|---|---|---|---|
| 5,122,287 | A | 6/1992 | Hsiung |
| 2002/0162783 | A1 | 11/2002 | Wyness |
| 2004/0159601 | A1 | 8/2004 | Perry |
| 2008/0173581 | A1* | 7/2008 | Maclean .................. C02F 3/085 210/620 |
| 2009/0294356 | A1* | 12/2009 | Beggs ................. B01D 24/4631 210/618 |
| 2012/0067818 | A1* | 3/2012 | Westrum ................... C02F 3/06 210/615 |

FOREIGN PATENT DOCUMENTS

| | | |
|---|---|---|
| CN | 203999002 U | 12/2014 |
| CN | 204447440 U | 7/2015 |
| CN | 105727603 A | 7/2016 |
| CN | 205710288 U | 11/2016 |
| CN | 106731060 A | 5/2017 |
| CN | 206553348 U | 10/2017 |
| DE | 2208513 A1 | 8/1973 |
| JP | S5135161 A | 3/1976 |
| JP | S5148562 A | 4/1976 |
| JP | S5314465 A | 2/1978 |
| JP | H10151473 A | 6/1998 |
| SU | 747491 A1 | 7/1980 |

OTHER PUBLICATIONS

Machine-generated English translation of CN205710288, dated Apr. 17, 2021.*
First Examination Report dated Oct. 3, 2019 for Australian patent application No. 2017372226, 5 pages.
Search Report dated Nov. 26, 2019 for European patent application No. 17878216.5, 8 pages.
International Search Report for PCT/CN2017/112605 dated Feb. 14, 2018, ISA/CN.
First Office Action dated Mar. 30, 2020 for Japanese patent application No. 2019-531247, English translation provided by Global Dossier.

* cited by examiner

HORIZONTAL-FLOW SAND FILTRATION POOL AND WATER TREATMENT PROCESS THEREOF

CROSS REFERENCE OF RELATED APPLICATION

This application is the national phase of International Application No. PCT/CN2017/112605, titled "HORIZONTAL FLOW SAND FILTER BASIN AND WATER TREATMENT PROCESS THEREOF", filed on Nov. 23, 2017, which claims priorities to Chinese Patent Application No. 201611109076.3, titled "HORIZONTAL FLOW SAND FILTER BASIN AND WATER TREATMENT PROCESS THEREOF", filed with the Chinese State Intellectual Property Office on Dec. 6, 2016, and Chinese Patent Application No. 201621328393.X, titled "HORIZONTAL FLOW SAND FILTER BASIN", filed with the China National Intellectual Property Administration on Dec. 6, 2016, the entire disclosures thereof are incorporated herein by reference.

FIELD

The present application relates to water treatment equipment, and in particular to a horizontal flow sand filter basin and a water treatment process thereof.

BACKGROUND

A sand filter basin is typical filtration equipment having a filter layer, which uses surface areas provided by a granular material of the filter layer to intercept solid particles and colloids in water, so as to clarify the water. The sand filter basin can intercept impurities in water having a particle size much smaller than a gap in the filter material mainly through contact flocculation, and also through sieve filtration and precipitation. Because the sand filter basin has many advantages such as large decontamination capacity, long working period and reliable operation, it is widely used in feed water treatment or advanced treatment of sewage after secondary treatment.

The operation of the sand filter basin is mainly a cycle of the two processes of filtration and backwash. In the present sand filter basin, the process of the raw water filtration is only carried out in a vertical direction, the filtration area is limited by the horizontal cross-sectional area of the equipment, and the sand layer is not fully utilized; during the flushing process of the sand grains, all the sand grains are mixed, and the sand grains cannot be classified and treated according to the degree of soiling of the sand grains.

SUMMARY

One object of the present application is to provide a horizontal flow sand filter basin, to solve the problems in the conventional sand filtration technology that the filtration area of the sand layer is limited, the sand layer is not fully utilized, and the filter sand having different degrees of soiling is mixed and flushed together.

To solve the technical problems, the following technical solution is provided according to the present application.

A horizontal flow sand filter basin includes a basin body, a raw water inlet assembly, a sand filter bed, a filtered water outlet assembly, an aeration assembly and a backwash assembly.

The sand filter bed is arranged in the basin body and is composed of filter sand;

the raw water inlet assembly includes a water inlet pipe and a water distribution device configured for feeding raw water into the sand filter bed, the water inlet pipe is connected to the water distribution device, the water distribution device is arranged in the sand filter bed, and multiple water outlet orifices are distributed on a vertical face of the water distribution device;

the filtered water outlet assembly includes a water collector and a water outlet pipe, a side of the water collector adjacent to the sand filter bed is provided with a water inlet orifice, and the water outlet pipe is in communication with the water collector;

the backwash assembly includes a backwash pipe and a drainage pipe, the backwash pipe can be connected to the water outlet pipe, the drainage pipe can be connected to the water distribution device.

Preferably, the water distribution device is arranged in an axial direction of the basin body or at an outer wall of the sand filter bed.

Preferably, the basin body is made of concrete. According to different process requirements, the basin body may also be made of other materials, such as steel, acrylic, or the like.

Preferably, the water distribution device is a water distribution stand pipe having a water outlet orifice. Further preferably, the water distribution device is formed by enclosure of a sieve plate having a wedge-wire filter surface, or one of a perforated pipe and a slot sieve, or any combination of the sieve plate having the wedge-wire filter surface, the perforated pipe and the slot sieve; the water collector is formed by enclosure of the sieve plate having the wedge-wire filter surface, or one of the perforated pipe, the slot sieve, a microfiltration membrane and an ultrafiltration membrane, or any combination of the sieve plate having the wedge-wire filter surface, the perforated pipe, the slot sieve, the microfiltration membrane and the ultrafiltration membrane.

Preferably, a layout of the water distribution device may employ multiple configurations such as a rectangular shape, a circular shape, an annular shape or a linear shape, or any combination of the rectangular shape, the circular shape, the annular shape and the linear shape.

Preferably, the water collector includes a sieve plate and two cover plates respectively located at a lower end and an upper end of the sieve plate, and a water collecting space is defined in the basin body by the sieve plate and the two cover plates.

Preferably, in a case that the water distribution device is arranged along the outer wall of the sand filter bed, the water collector is arranged in the axial direction of the sand filter bed.

Preferably, the sieve plate in the water collector is embodied as sheet-like structures arranged continuously or at intervals along an inner wall of the basin body, the sheet-like structures may be arc-shaped sheets, terrace-shaped sheets, bent sheets, flat sheets or sheets of other geometric shapes, and protrusions of the sieve plate are towards an inside of the basin body; or the sieve plate is a cylinder on which water distribution holes are distributed. According to different process requirements, the sieve plate may also be of other forms, such as a continuous whole sheet, rectangular sheets arranged at intervals, or the like.

Preferably, the water collector is provided with at least one water collecting branch pipe in communication with an outside of the basin body, and an outlet of the water collecting branch pipe is connected to the water outlet pipe outside the basin body.

Preferably, the aeration assembly is composed of an aeration pipe and multiple aeration devices connected to the aeration pipe, and the aeration assembly is mounted at a bottom of the basin body.

Preferably, valves are arranged on the water inlet pipe, the water outlet pipe, the backwash pipe, and the drainage pipe.

Preferably, the backwash assembly is further provided with a backwash water tank configured for storing part of the filtered water, and the filtered water is used as flushing water in a flushing process, which greatly reduces the consumption of clean water.

Preferably, an aeration device is a sieve plate having a wedge-wire filter surface.

According to different process requirements, the aeration device may also be of other forms, such as a perforated pipe, a slot sieve, or a rigid air distribution device with appropriate form or strength, or any combination of the sieve plate, the perforated pipe, the slot sieve and the rigid air distribution devices.

A water treatment process of a horizontal flow sand filter basin includes the following two processes:

1. filtration process: the raw water enters the horizontal flow sand filter basin through the water inlet pipe, enters the sand filter bed uniformly and smoothly through the water outlet orifices of the water distribution device, and flows past the filter sand in a horizontal direction of the basin body from inside to outside or from outside to inside; during the filtration process, suspended particles or contaminants in the water are intercepted by sand grains, and with radial filtration, an efficiency of the filter sand is maximized; finally, the filtered water is collected by the water collector, converged in the water outlet pipe and drained out;

2. backwash process: the flushing water enters the basin body through the backwash pipe and enters the sand filter bed; compressed air is fed into the aeration pipe, and enters the sand filter bed from bottom to top in the form of bubbles through the aeration device at a bottom of the basin body; the impurities and the contaminants are separated from surfaces of the sand grains by gas phase agitation, a shearing force of water flow and collision and friction between the sand grains, and enter the flushing water; a degree of the gas phase agitation is adjusted, to control tumbling of the sand grains, and by reverse cleaning of the flushing water, the dirty sand grains in different areas having different degrees of soiling are respectively cleaned without being mixed; after a period of time, the flushing water having contaminations is converged in the water distribution device, and drained out of the horizontal flow sand filter basin through a drainage pipe.

Another water treatment process of a horizontal flow sand filter basin includes the following two processes:

1. biological filtration process: under a suitable culture condition, a gelatinous biofilm is formed on a surface of filter sand; the raw water enters the horizontal flow sand filter basin through the water inlet pipe, then enters the sand filter bed uniformly and smoothly through the water outlet orifices of the water distribution device, and then flows past the filter sand in a horizontal direction of the basin body from inside to outside or from outside to inside; the aeration assembly is started, and the compressed air passes through the aeration assembly, and is released into the sand filter basin from bottom to top in the form of small bubbles, so as to fully supply oxygen; when the raw water flows past a surface of the filter sand, the soluble, gelatinous and suspended substances in the raw water are adsorbed on the biofilm and degraded by the microorganisms; finally, the filtered water is collected by the water collector, converged in the water outlet pipe and drained out;

2. backwash process: the flushing water enters the basin body through the backwash pipe and enters the sand filter bed; compressed air is fed into the aeration pipe, passes through the aeration devices at a bottom of the basin body, and enters the sand filter bed from bottom to top in the form of bubbles; impurities and contaminants are separated from surfaces of the sand grains by gas phase agitation, a shearing force of water flow and collision and friction between the sand grains, and enter the flushing water; a degree of the gas phase agitation is adjusted, to control tumbling of the sand grains, and by reverse cleaning of the flushing water, the dirty sand grains in different areas having different degrees of soiling are respectively cleaned without being mixed; after a period of time, the flushing having the contaminations is converged in the water distribution device, and drained out of the horizontal flow sand filter basin through a drainage pipe.

Preferably, part of the filtered water may be temporarily stored in the backwash water tank and reused as flushing water in the subsequent backwash process.

The horizontal flow sand filter basin according to the present application can realize the following functions:

1. simple sand filtration, to remove solid particles and colloidal suspensions in the raw water;

2. during the filtration process, the aeration assembly is started to construct an aerobic biological filter, and a cutting effect of a sand filter layer on the bubbles prolongs a residence time of the bubbles in the filter basin, thereby improving a utilization rate of oxygen.

3. during the filtration process, the aeration assembly is closed to construct an anoxic biological filter bed, since the filter basin has excellent contamination interception ability, there is no need to provide a secondary sedimentation basin.

The beneficial effects of the present application are as follows.

1. The filtration area is increased. In the present fixed sand filter basin or continuous sand filter equipment, the raw water enters the sand filter bed from the water distributor located at the bottom. The raw water is filtered from bottom to top, and the filtration area is only the horizontal cross-sectional area of the sand filter bed. By employing the water distribution device according to the present application, the raw water flows past the filter bed horizontally, the filtration area is greatly increased, which not only improves the quality of the filtered water, but also reduces the occupied area of the sand filter basin.

2. The filter sand is washed in different areas. With the filtration, solid contaminants are gradually deposited on the surface of the sand grains, and the degree of soiling of the sand grains is gradually decreased from the water distribution device to the water collector. During the reverse sand washing process, the dirty sand grains in different areas having different degrees of soiling are cleaned separately without being mixed, and the sand washing process is more thorough.

3. Water and energy are saved. By further providing a backwash water tank, part of the filtered water is stored, and the filtered water is reused as flushing water in the flushing process, which greatly reduces the consumption of the clean water. The efficiency of the sand filtration is improved, which prolongs the backwash cycle, reduces the sand washing frequency, and reduces the energy consumption of the sand washing.

4. The horizontal flow sand filter basin according to the present application may be used as a filtering device, moreover, under a suitable culture condition, the horizontal flow sand filter basin may be a biological reaction basin integrating biological contact oxidation and an suspended substance intercepting function of the filter bed by using the filter material composed of sand grains to fix the biofilm, which can effectively remove solid suspended substances in the water and reduces COD, BOD, turbidity, chromaticity, etc.

BRIEF DESCRIPTION OF THE DRAWINGS

FIG. 2-1 is an enlarged view of portion A in FIG. 2;

REFERENCE NUMERALS IN FIGURES

| 1  | basin body,                | 2  | water inlet pipe,           |
|----|----------------------------|----|-----------------------------|
| 3  | water distribution device, | 4  | sand filter bed,            |
| 5  | water collector,           | 51 | sieve plate,                |
| 52 | cover plate,               | 6  | water collecting branch pipe, |
| 7  | water outlet pipe,         | 8  | backwash pipe,              |
| 9  | drainage pipe,             | 10 | aeration pipe,              |
| 11 | aeration device.           |    |                             |

DETAILED DESCRIPTION

The technical solutions according to the present application will be further described hereinafter through specific embodiments in conjunction with the drawings. It should be understood that the embodiments of the present application are not limited to the embodiments described hereinafter, and any form of modifications and/or changes made to the present application are deemed to fall into the scope of the present application.

First Embodiment

Figure 1:
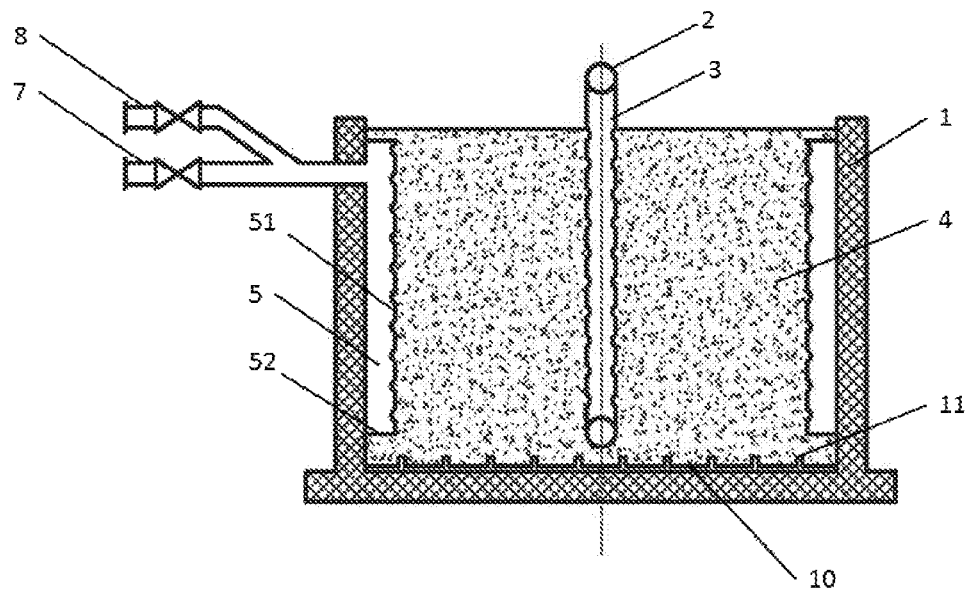
FIG. 1 is a schematic front view of a horizontal flow sand filter basin according to the present application.
Figure 2:
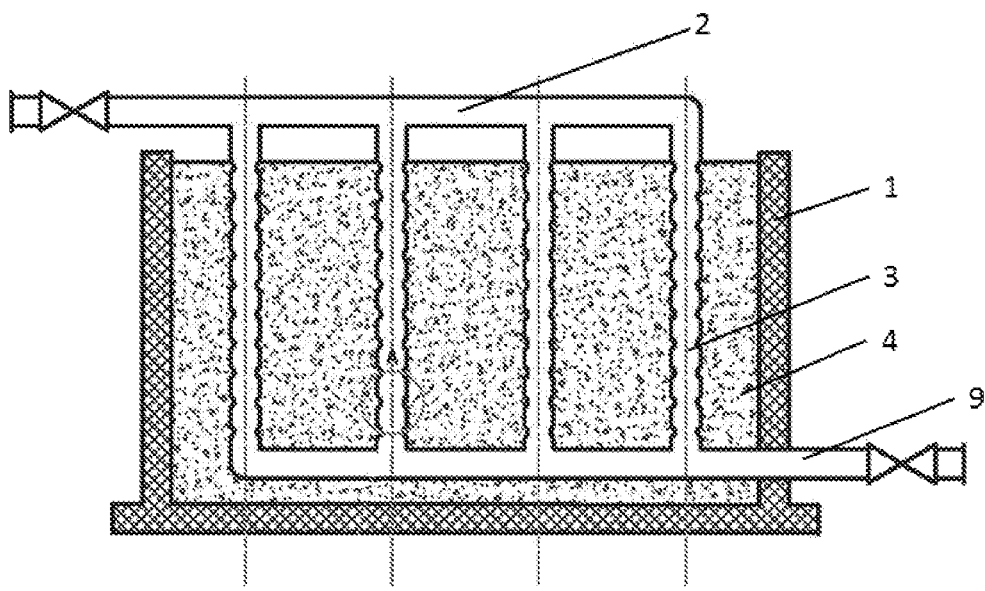
FIG. 2 is a schematic left view of the horizontal flow sand filter basin according to the present application.
Figures 1, 2:
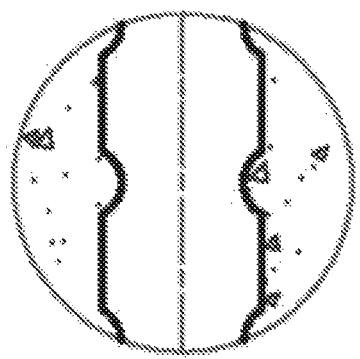
Figure 3:
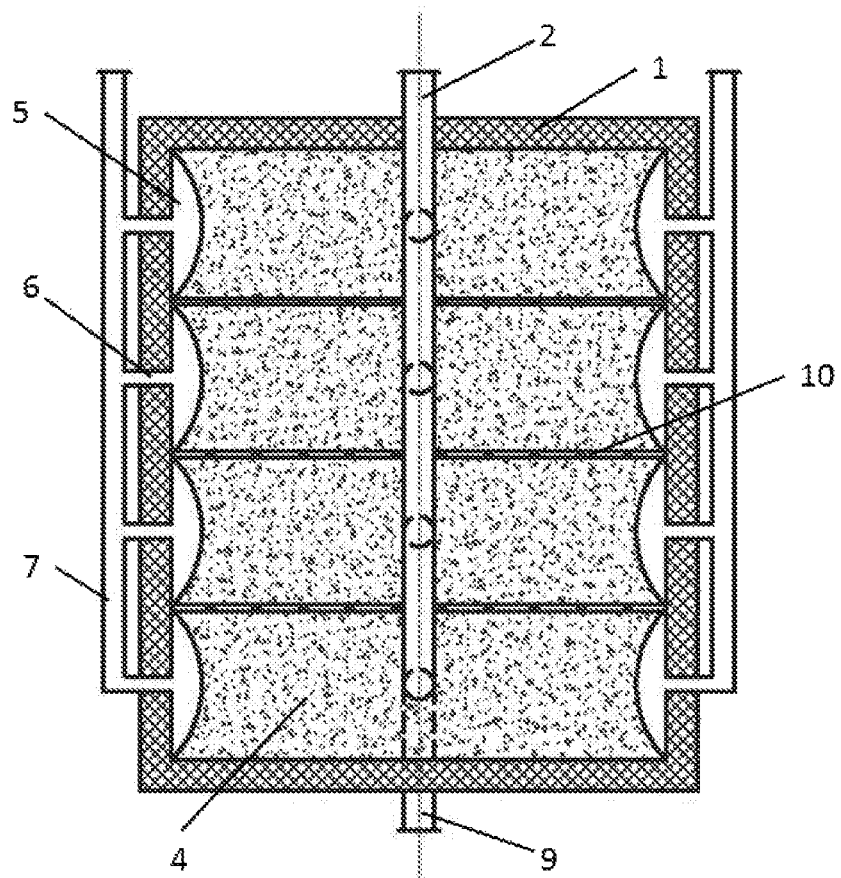
FIG. 3 is a schematic top view of the horizontal flow sand filter basin according to the present application.

As shown in FIG. 1, FIG. 2, FIG. 2-1 and FIG. 3, a horizontal flow sand filter basin is composed of a basin body 1, a raw water inlet assembly, a sand filter bed 4, a filtered water outlet assembly, an aeration assembly, and a backwash assembly. The raw water inlet assembly is configured to feed raw water into the sand filter bed 4 and distribute the raw water uniformly.

The basin body 1 is rectangle shaped and made of concrete.

The raw water inlet assembly is composed of a water inlet pipe 2 and a water distribution device 3 connected to the water inlet pipe 2, the water inlet pipe 2 is provided with a valve, and the water inlet pipe 2 is configured for introducing the raw water into the horizontal flow sand filter basin. The water distribution device 3 is embodied as four water distribution stand pipes, water outlet orifices are uniformly distributed in each of the water distribution stand pipes, and the water distribution stand pipes are vertically arranged and uniformly distributed in the sand filter bed 4. The water distribution stand pipe may be formed by enclosure of a sieve plate having a wedge-wire filter surface, and the raw water enters the sand filter bed 4 uniformly and smoothly through sieve slits of the sieve plate. A water distribution structure of the water distribution stand pipes according to the present application is not limited thereto, and this is merely a preferred embodiment.

The sand filter bed 4, composed of filter sand, is located in the basin body 1 and extends upward from a bottom of the basin body 1, and the sand filter bed 4 is configured to filter the raw water. The filter sand is the main material for purifying and filtering the raw water, quartz sand, activated carbon, anthracite, glass ball, ceramsite and other filter media may be chosen, and a type of the filter sand and particle gradation should be selected according to raw water quality and water quality requirements of filtered water.

The filtered water outlet assembly is composed of a water collector 5, water collecting branch pipes 6 and a water outlet pipe 7. The water collector 5 includes a sieve plate 51 having a wedge-wire filter surface and two cover plates 52 respectively located at an upper end and a lower end of the sieve plate 51, a water collecting space is formed on an inner wall of the basin body 1 by the sieve plate 51 and the two cover plates 52. The water collector 5 is provided with the water collecting branch pipes 6 in communication with an outside of the basin body 1, and an outlet of each of the water collecting branch pipes 6 is connected to the water outlet pipe 7 at an outer wall of the basin body 1. The filtered water which has passed through the sand filter bed 4 enters the water collector 5 through sieve slits of the sieve plate 51. As shown in FIG. 3, sieve plates 51 in this embodiment are arc-shaped sheets, and protrusions of the sieve plates 51 are toward an inside of the basin body 1. An inner wall of each of two sides of the basin body 1 is provided with four arc-shaped sheets, the four arc-shaped sheets are arranged at uniform intervals along the inner wall of the basin body 1, and the sieve plates 51 having shapes of arc sheets are configured for better collecting the filtered water which has passed through the sand filter bed 4. The water collecting branch pipes 6 are connected to the water collector 5. The water outlet pipe 7 drains the filtered water which has passed through the sand filter bed 4 out of the basin body 1.

The backwash assembly includes a backwash pipe 8 and a drainage pipe 9, the backwash pipe 8 is provided with a valve and connected with the water outlet pipe 7, and the drainage pipe 9 is provided with a valve and connected to bottoms of the four water distribution stand pipes. Flushing water enters the water collector 5 through the backwash pipe 8, and the drainage pipe 9 drains waste water of sand washing out of the horizontal flow sand filter basin.

The aeration assembly is composed of an aeration pipe 10 and multiple aeration devices 11 connected to the aeration pipe 10. During a backwash process of the sand filter basin, compressed air passes through the aeration assembly and is released into the sand filter basin in a form of small bubbles. The aeration assembly is mounted at the bottom of the basin body 1.

A water treatment process of a horizontal flow sand filter basin includes the following two processes:

1. filtration process. The valve in the water inlet pipe 2 is opened, the valve in the water outlet pipe 7 is opened, the valve in the backwash pipe 8 is closed, and the valve in the drainage pipe 9 is closed. The raw water enters the horizontal flow sand filter basin through the water inlet pipe 2, then enters the sand filter bed 4 uniformly and smoothly through the water distribution stand pipes, and then flows past the filter sand in a horizontal direction of the basin body 1 from inside to outside. During the filtration process, large-sized suspended particles or contaminants in the water are intercepted by sand grains at an inner layer, and small-sized contaminants are deposited between sand grains at an outer layer, and efficiency of the filter sand is maximized with the inside to outside filtration. Finally, the filtered water is collected by the water collector 5 uniformly arranged on the inner wall of the basin body 1, the filtered water flows through the water collecting branch pipes 6, and is converged in the water outlet pipe 7 and drained out.

2. backwash process. The valve in the water inlet pipe 2 is closed, the valve in the water outlet pipe 7 is closed, the valve in the backwash pipe 8 is opened, and the valve in the drainage pipe 9 is closed. The part of the filtered water which is temporarily stored is used as the flushing water, the flushing water enters the water collector 5 on the inner wall of the basin body 1 through the backwash pipe, and enters the sand filter bed 4 through orifices in a surface of the water collector 5. The compressed air is fed into the aeration pipe 10, passes through the aeration devices 11 at the bottom of the basin body 1, and enters the sand filter bed 4 from bottom to top in the form of bubbles. Impurities and contaminants are separated from surfaces of the sand grains by gas phase agitation, a shearing force of water flow and collision and friction between the sand grains, and enter the flushing water. During the horizontal flow filtration process, a degree of soiling of the sand grains is gradually decreased from around the water distribution stand pipes to walls of the sand filter basin. A degree of the gas phase agitation is adjusted, to control tumbling of the sand grains within a certain range, and by reverse cleaning of the flushing water, the dirty sand grains in different areas having different degrees of soiling are respectively cleaned without being mixed. After a period of time, the valve of the drainage pipe 9 is opened, the valve of the backwash pipe 8 is still opened, and the flushing water with contaminations is converged in the water distribution stand pipes, and drained out of the horizontal flow sand filter basin through the drainage pipe 9.

The horizontal flow sand filter basin according to the present application can also realize a function of a biological filter. The biological filter employs aerobic microorganisms to perform biological oxidization to the raw water. Another water treatment process of a horizontal flow biological filter includes the following two processes:

1. biological filtration process. A gelatinous biofilm is formed on a surface of the filter sand under a suitable culture condition. The raw water enters the horizontal flow sand filter basin through the water inlet pipe 2, and enters the sand filter bed 4 uniformly and smoothly through the water distribution stand pipes, and flows past the filter sand in the horizontal direction of the basin body 1 from inside to outside. The aeration assembly is started, the compressed air passes through the aeration assembly, and is released into the sand filter basin from bottom to top in the form of small bubbles, so as to fully supply oxygen. When the raw water flows past the surface of the filter sand, the soluble, gelatinous and suspended substances in the raw water are adsorbed on the biofilm and degraded by the microorganisms. Finally, the filtered water is collected by the water collector 5 on the inner wall of the basin body 1, flows through the water collecting branch pipes 6, and is converged in the water outlet pipe 7 and drained out.

2. backwash process. The backwash process is the same as the backwash process described above.

Second Embodiment

A horizontal flow sand filter basin includes a basin body 1, a raw water inlet assembly, a sand filter bed 4, a filtered water outlet assembly, a backwash assembly and an aeration assembly, and the specific structure of the horizontal flow sand filter basin is similar to that in the embodiment 1, and the differences are as follows.

Figure 4:
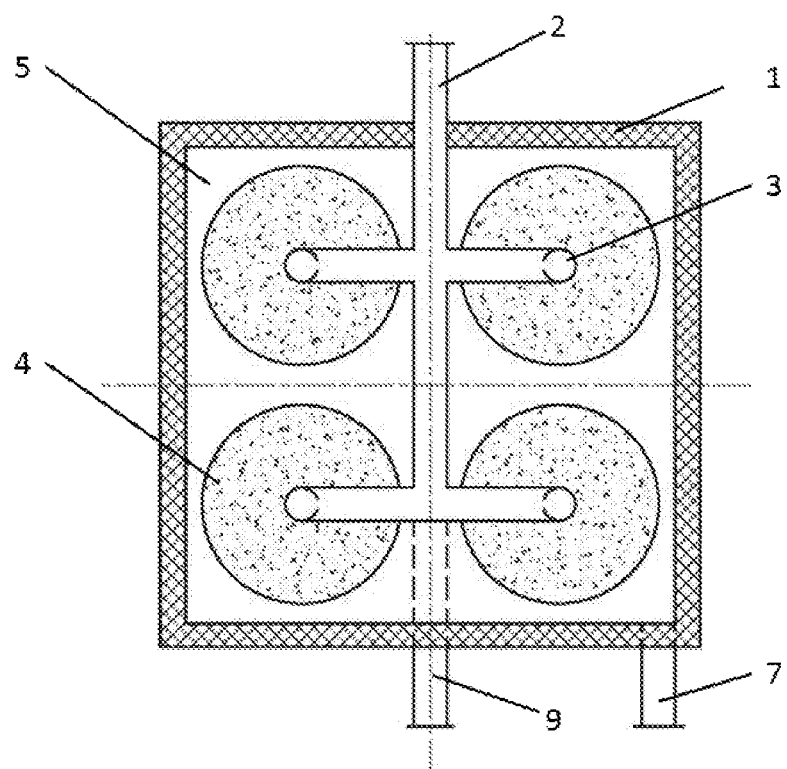
FIG. 4 is another schematic top view of a horizontal flow sand filter basin according to the present application.

As shown in FIG. 4, an inside of the basin body 1 is divided into four circular regions corresponding to four water distribution devices 3, respectively. The circular regions are arranged in a rectangular shape, and each of the circular regions is provided with one sand filter bed 4 and one water distribution device 3. The water inlet pipe 2 in the raw water inlet assembly is connected to the four water distribution devices 3 respectively; the water distribution device 3 is a water distribution stand pipe, and the water distribution stand pipe may be formed by enclosure of a slot sieve. Bottoms of the four water distribution stand pipes are connected to the drainage pipes 9.

The filtered water outlet assembly is composed of a water collector 5 and a water outlet pipe 7. Sieve plates 51 in the water collector 5 are cylindrical slot sieves, and the sieve plates 51 are fixed to inner walls of the basin body 1. Cover plates 52 are determined according to projection configurations of the sieve plates 51 and the inner walls of the basin body 1 on a horizontal surface. A water collecting space is defined by the sieve plates 51, an upper cover plate and a lower cover plate of each of the sieve plates 51, and the inner walls of the basin body 1, and the water collecting space is shared by the entire basin body 1. The water collecting space can temporarily store the filtered water. The water outlet pipe 7 is in communication with the water collecting space.

The water treatment process of the horizontal flow sand filter basin according to this embodiment is similar to that of the first embodiment, and the differences are as follows.

The filtered water enters the water collecting space formed by the water collector 5 and the inner walls of the basin body 1, and is drained through the water outlet pipe 7. The above water collecting space may function to temporarily store the filtered water.

Only two preferred embodiments of the present application are described above, which are not intended to limit the present application in any form. There are other variants and modifications without departing from the technical solutions described in the claims.

The invention claimed is:

1. A horizontal flow sand filter basin, comprising: a basin body, a raw water inlet assembly, a sand filter bed, a filtered water outlet assembly, an aeration assembly and a backwash assembly, wherein the sand filter bed is arranged in the basin body, and the sand filter bed is composed of filter sand;

the raw water inlet assembly comprises an water inlet pipe and a water distribution device configured for feeding raw water into the sand filter bed, the water inlet pipe is connected to the water distribution device, the water distribution device is arranged in the sand filter bed, and a plurality of water outlet orifices are distributed in a vertical face of the water distribution device;

the filtered water outlet assembly comprises a water collector and a water outlet pipe, a side of the water collector adjacent to the sand filter bed is provided with a water inlet orifice, the water outlet pipe is in communication with the water collector, the water collector comprises a sieve plate and two cover plates respectively located at an upper end and a lower end of the sieve plate, and a water collecting space is defined in the basin body by the sieve plate and the two cover plates;

the backwash assembly comprises a backwash pipe and a drainage pipe, the backwash pipe can be connected to the water outlet pipe, the drainage pipe can be connected to the water distribution device.

2. The horizontal flow sand filter basin according to claim 1, wherein the water distribution device is arranged in an axial direction of the sand filter bed, or the water distribution device is arranged along an outer wall of the sand filter bed.

3. The horizontal flow sand filter basin according to claim 2, wherein in a case that the water distribution device is arranged along the outer wall of the sand filter bed, the water collector is arranged in the axial direction of the sand filter bed.

4. The horizontal flow sand filter basin according to claim 1, wherein the water distribution device is formed by enclosure of a sieve plate having a wedge-wire filter surface, or one of a perforated pipe and a slot sieve, or any combination of the sieve plate having the wedge-wire filter surface, the perforated pipe and the slot sieve; the water collector is formed by enclosure of the sieve plate having the wedge-wire filter surface, or one of the perforated pipe, the slot sieve, a microfiltration membrane and an ultrafiltration membrane, or any combination of the sieve plate having the wedge-wire filter surface, the perforated pipe, the slot sieve, the microfiltration membrane and the ultrafiltration membrane.

5. The horizontal flow sand filter basin according to claim 4, wherein the sieve plate in the water collector is embodied as sheet-like structures arranged continuously or at intervals along an inner wall of the basin body, the sheet-like structures are arc-shaped sheets, terrace-shaped sheets, bent sheets, flat sheets or sheets of other geometric shapes, and protrusions of the sieve plate are towards an inside of the basin body; or the sieve plate is a cylinder on which water distribution holes are distributed.

6. The horizontal flow sand filter basin according to claim 1, wherein a layout of the water distribution device is embodied as a rectangular shape, a circular shape, an annular shape or a linear shape, or any combination of the rectangular shape, the circular shape, the annular shape and the linear shape.

7. The horizontal flow sand filter basin according to claim 1, wherein the water collector is provided with at least one water collecting branch pipe in communication with an outside of the basin body, and an outlet of the water collecting branch pipe is connected to the water outlet pipe outside the basin body.

8. A water treatment process of a horizontal flow sand filter basin, wherein the water treatment process comprises the following two processes:

1. filtration process: feeding raw water into the horizontal flow sand filter basin through a water inlet pipe, allowing the raw water to enter a sand filter bed uniformly and smoothly through water outlet orifices of a water distribution device, and flow past filter sand in a horizontal direction of a basin body from inside to outside or from outside to inside; during the filtration process, gradually intercepting, by sand grains, suspended particles or contaminants in the water, and an efficiency of the filter sand is maximized by radial filtration; finally, collecting filtered water by a water collector, converging the filtered water in a water outlet pipe, and discharging the filtered water;

2. backwash process: allowing flushing water to enter the basin body through a backwash pipe and enter the sand filter bed; feeding compressed air into an aeration pipe, and allowing the compressed air to enter the sand filter bed from bottom to top in a form of bubbles through an aeration device at a bottom of the basin body, allowing impurities and the contaminants to be separated from surfaces of the sand grains by gas phase agitation, a shearing force of water flow and collision and friction between the sand grains, and allowing the impurities and the contaminants to enter the flushing water; controlling tumbling of the sand grains by adjusting a degree of the gas phase agitation, and by reverse cleaning of the flushing water, dirty sand grains in different areas having different degrees of soiling are respectively cleaned without being mixed; after a period of time, converging the flushing water having the contaminants in the water distribution device, and discharging the flushing water out of the horizontal flow sand filter basin through a drainage pipe.

9. A water treatment process of a horizontal flow sand filter basin, wherein the water treatment process comprises the following two processes:

1. biological filtration process: forming, under a suitable culture condition, a gelatinous biofilm on a surface of filter sand; feeding raw water into the horizontal flow sand filter basin through a water inlet pipe, allowing the raw water to enter a sand filter bed uniformly and smoothly through water outlet orifices of a water distribution device, and flow past the filter sand in a horizontal direction of a basin body inside to outside or from outside to inside starting an aeration assembly, and allowing compressed air to pass through the inside; starting an aeration assembly, and allowing compressed aft to pass through the aeration assembly to be released into the sand filter basin from bottom to top in a form of small bubbles, so as to fully supply oxygen; when the raw water flows past a surface of the filter sand, allowing soluble, gelatinous and suspended substances om the raw water to be adsorbed on the biofilm and degraded by microorganisms; finally, collecting filtered water by a water collector, converging the filtered water in a water outlet pipe, and discharging the filtered water;

2. backwash process: allowing flushing water to enter the basin body through a backwash pipe and enter the sand filter bed; feeding compressed air into an aeration pipe, and allowing the compressed air to enter the sand filter bed from bottom to top in a form of bubbles through an aeration device at a bottom of the basin body, allowing impurities and contaminants to be separated from surfaces of sand grains by gas phase agitation, a shearing force of water flow and collision and friction between the sand grains, and allowing the impurities and the contaminants to enter the flushing water; controlling tumbling of the sand grains by adjusting a degree of the gas phase agitation, and by reverse cleaning of the flushing water, dirty sand grains in different areas having different degrees of soiling are respectively cleaned without being mixed; after a period of time, converging the flushing water having the contaminants in the water distribution device, and discharging the flushing water out of the horizontal flow sand filter basin through a drainage pipe.

* * * * *